A. FINCKBEIN.
PROCESS OF MAKING SLOT WINDINGS FOR DYNAMO ELECTRIC MACHINES.
APPLICATION FILED JUNE 10, 1913.

1,183,287. Patented May 16, 1916.

UNITED STATES PATENT OFFICE.

ADOLF FINCKBEIN, OF CHARLOTTENBURG, GERMANY, ASSIGNOR TO SIEMENS-SCHUCKERT WERKE, G. M. B. H., OF BERLIN, GERMANY, A CORPORATION OF GERMANY.

PROCESS OF MAKING SLOT-WINDINGS FOR DYNAMO-ELECTRIC MACHINES.

1,183,287.      Specification of Letters Patent.      Patented May 16, 1916.

Application filed June 10, 1913. Serial No. 772,924.

*To all whom it may concern:*

Be it known that I, ADOLF FINCKBEIN, a citizen of the German Empire, and residing at Charlottenburg, near Berlin, Germany, have invented a certain new and useful Improved Process of Making Slot-Windings for Dynamo-Electric Machines, of which the following is a specification.

My invention relates to the manufacture of slot-windings for dynamo-electric machines.

In electrical machines having closed or half-open slots it is well known to insert ready-insulated rectilinear bundles of conductors into the slots and then to unite the ends to form a coil. Also, the coils can be wound as former-windings in the final form, and then be cut at one or more places, the parts being then pushed into the grooves. This known method has, however, the disadvantage that either the cut is located near the portion of the winding in the grooves and the insulation is therefore readily damaged when the parts are reunited, or it is necessary repeatedly to bend the wires before and after they have been placed into the grooves.

A primary object of my invention is to provide an improved process of manufacturing slot-windings to which these defects are not attached. To this end, I make the coil in the form of an isosceles triangle.

Figure 1:
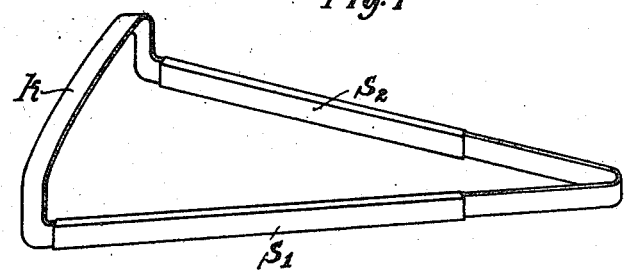
Figure 2:
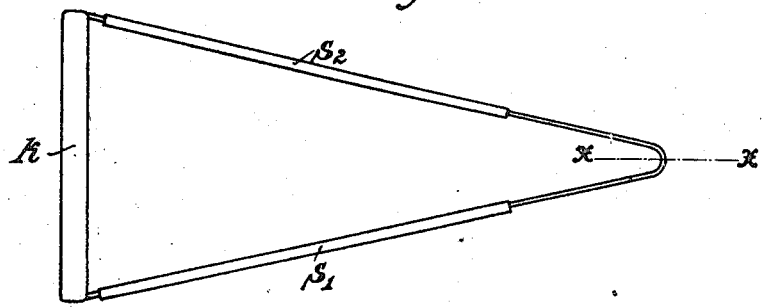
Figure 3:
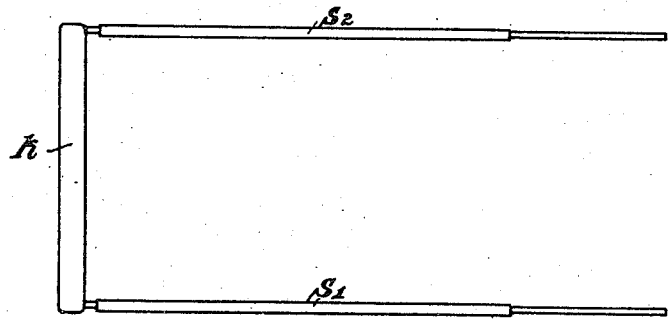

The accompanying drawing illustrates one form of slot-winding made according to my improved process, Figure 1 being a perspective view and Fig. 2 a top plan view of the winding in its original triangular shape, and Fig. 3 the winding of Fig. 2 in its proper shape for being inserted into the slots of the armature.

Referring to the drawing, the base $k$ of the triangle has the final shape of the end connection, and the sides $s_1$ and $s_2$ have those portions which lie in the slots insulated as desired. When the triangular coil is cut open at the apex, at the place designated $x$—$x$ in Fig. 2, the two sides can be pushed into the slot without any material difficulty. The cut ends of the sides are then connected in suitable manner by bending and soldering to form an end connection.

The described process is of special importance for machines having slots which are wholly or partially closed, owing to its allowing these to be provided with coils which are wound on one single former for all the coils of a machine.

The coils cut open are then inserted alternately from different sides into the slots and can then be closed simultaneously at the two sides of the machine.

I claim:—

A process of forming coils for slotted armatures consisting in winding a conductor as a closed coil in the form of a triangle having a base constituting one end connection, in insulating portions of the sides of the triangular coil, in cutting open the triangular coil at its apex and bending the sides apart.

In testimony whereof, I have signed my name to this specification in the presence of two witnesses.

ADOLF FINCKBEIN.

Witnesses:
   HENRY HASPER,
   WOLDEMAR HAUPT.